United States Patent [19]

Baxter

[11] Patent Number: 5,000,507
[45] Date of Patent: Mar. 19, 1991

[54] LAND VEHICLE ROOF STRUCTURE
[75] Inventor: Bobby G. Baxter, Warrenton, Mo.
[73] Assignee: The Binkley Company, Warrenton, Mo.
[21] Appl. No.: 500,794
[22] Filed: Mar. 28, 1990
[51] Int. Cl.⁵ .............................................. B62D 25/06
[52] U.S. Cl. ..................................... 296/104; 296/118; 52/731
[58] Field of Search ................ 296/104, 118, 214; 52/731, 738

[56] References Cited

U.S. PATENT DOCUMENTS

| | | | |
|---|---|---|---|
| 1,093,657 | 4/1914 | Sisson | 296/118 X |
| 2,099,649 | 11/1937 | Hall | 296/214 |
| 2,823,951 | 2/1958 | Stahl | 296/118 X |
| 3,379,469 | 4/1968 | Elia | 296/214 X |
| 3,700,277 | 10/1972 | Montean, Jr. | 296/104 |
| 3,894,766 | 7/1975 | Woodward | 296/104 |
| 4,089,558 | 5/1978 | Banerjea et al. | 296/214 |
| 4,660,882 | 4/1987 | Hensiek | 296/104 |

Primary Examiner—Margaret A. Focarino
Assistant Examiner—Joseph D. Pape
Attorney, Agent, or Firm—Senniger, Powers, Leavitt & Roedel

[57] ABSTRACT

Roof structure for a land vehicle, such as a tractor-trailer, comprising a series of roof bows extending transversely across the top of the vehicle spaced at intervals along the length of the vehicle, each roof bow being formed of sheet metal to have in transverse cross-section a central web, side flanges integral with the web extending downwardly from the web, and lips integral with the flanges at the lower edge of the flanges opposite the web extending inwardly toward one another from the flanges and terminating short of the central vertical longitudinal plane of the beam so that the roof bow has a longitudinal slot at the bottom thereof, and a ceiling comprising sheets of plywood at the bottom of the roof bows, with fasteners for securing the sheets in place each extending up through a hole in the respective sheet and through the slot of a respective roof bow and engaging the bottom of the respective sheet and lips at opposite sides of the slot of a respective roof bow.

23 Claims, 4 Drawing Sheets

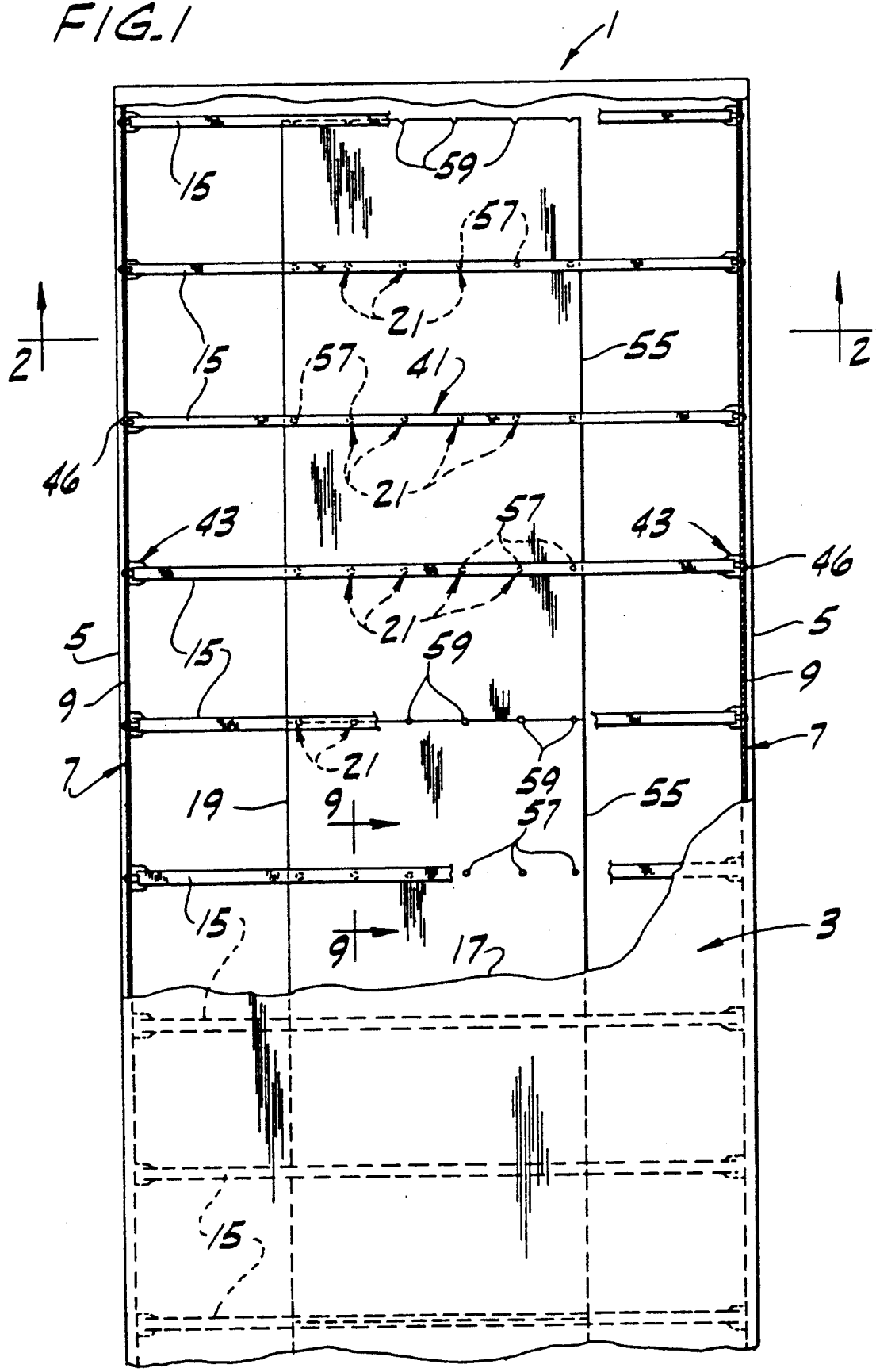

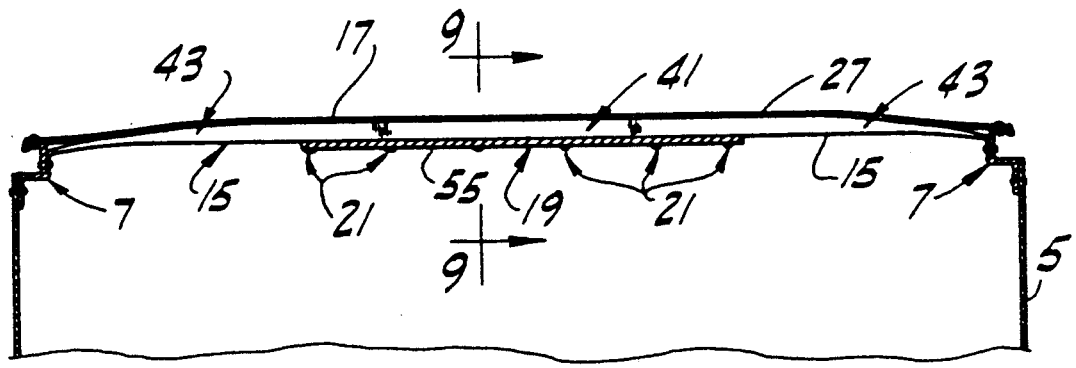
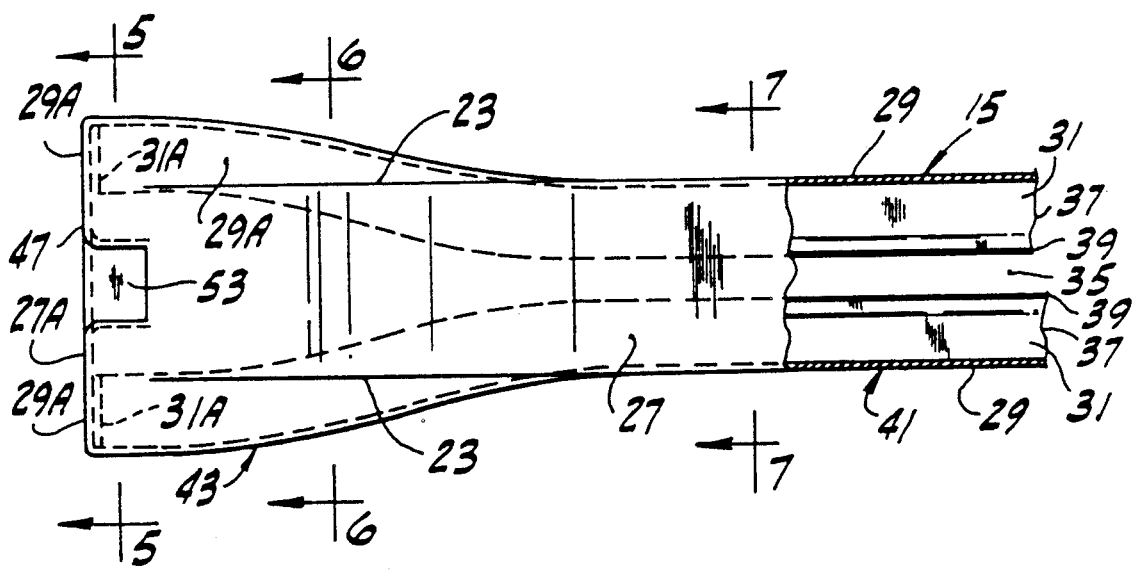
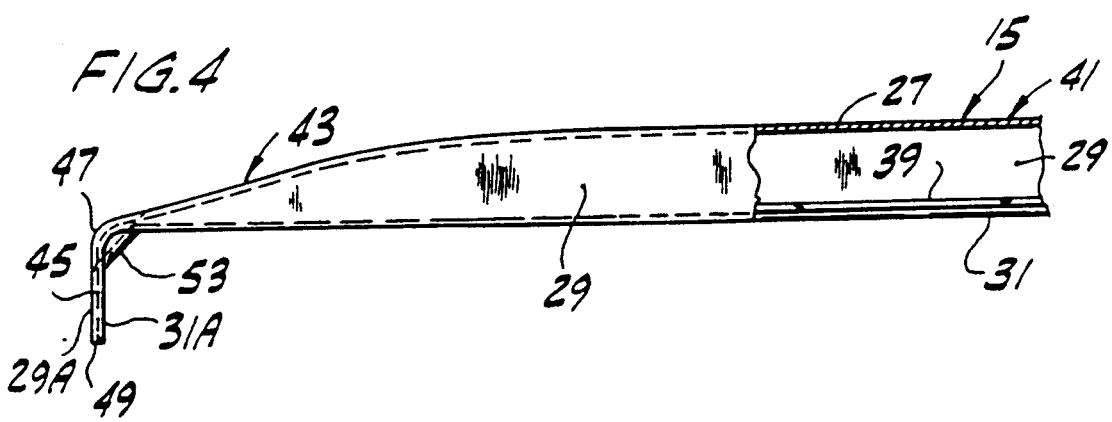

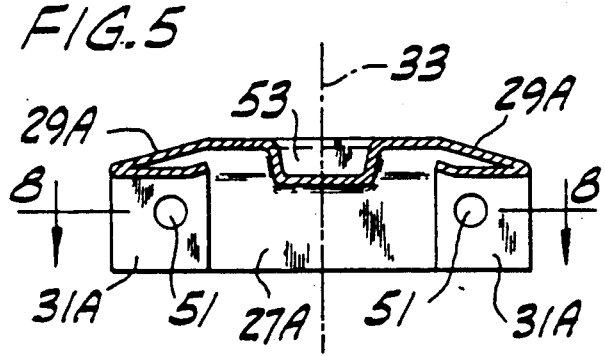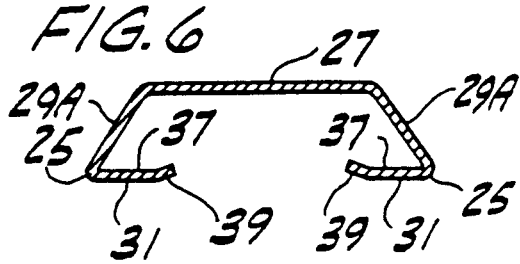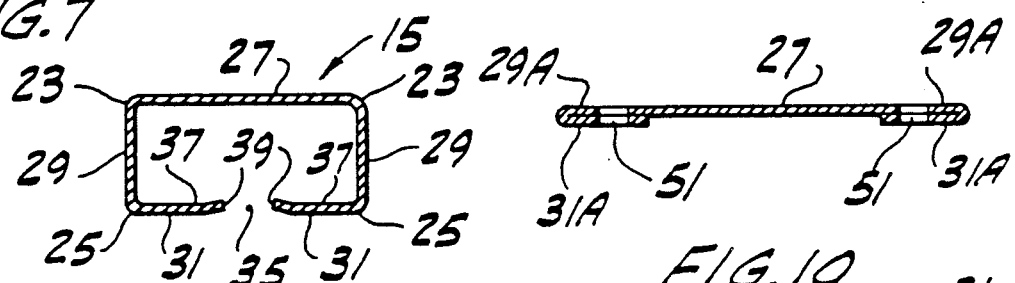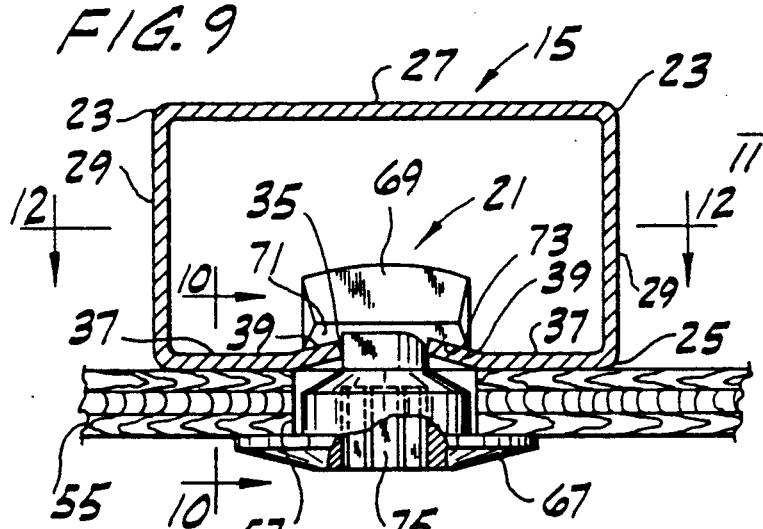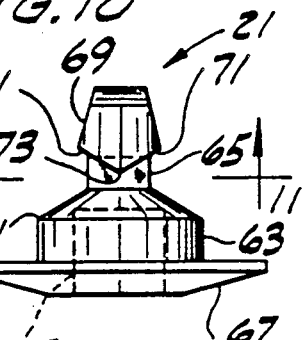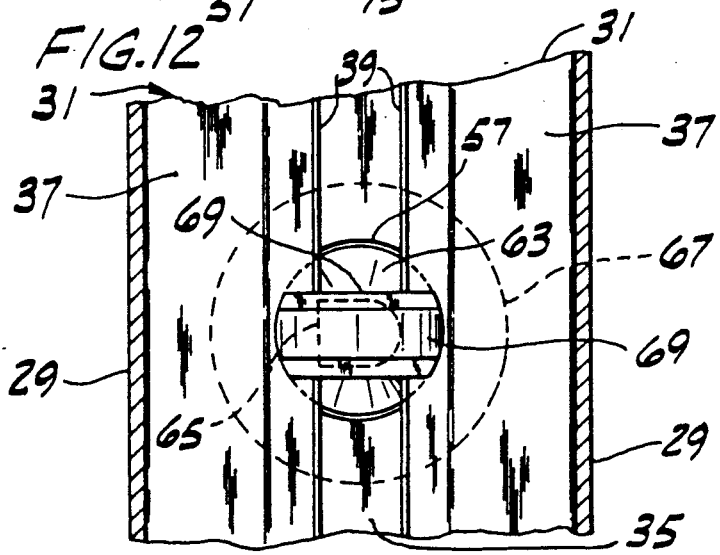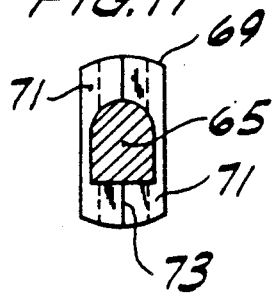

LAND VEHICLE ROOF STRUCTURE

BRIEF SUMMARY OF THE INVENTION

This invention relates to land vehicle roof structure, and more particularly to roof structure for such land vehicles as trailers, vans and trucks.

The invention is especially concerned with trailer roof structures comprising beams, also referred to as roof bows, extending transversely across the top of the trailer with a roof covering on the beams. Reference may be made to the coassigned U.S. Pat. No. 4,660,882 issued Apr. 28, 1987 for a disclosure of a roof bow for such roof structure. It has been found desirable to Provide a ceiling in such roof structures for protection of the roof bows against damage such as may be caused by carelessness in loading the trailer, e.g. carelessness in stacking boxes in the trailer using a lift driven into the trailer.

Among the several objects of this invention may be noted the provision of a roof structure such as described with a ceiling for protecting the roof bows, e.g. a ceiling comprising plywood sheeting, in an economical manner both as to materials and the labor involved in the installation of the ceiling; the provision of a roof bow which, while generally having the attributes of the roof bow of said U.S. Pat. No. 4,660,882, is also adapted for easy, economical installation of the ceiling; and the provision of fastener means for use in conjunction with the roof bows for such installation.

The roof structure of this invention is applicable to various land vehicles, such as a tractor-trailer, and in general comprises a series of beams (roof bows) extending transversely across the top of the vehicle spaced at intervals along the length of the vehicle. Each beam is formed of sheet metal to have in transverse cross-section a central web, side flanges integral with the web extending downwardly from the web, and lips integral with the flanges at the lower edges of the flanges opposite the web extending inwardly toward one another from the flanges and terminating short of the central vertical longitudinal plane of the beam so that the beam has a longitudinal slot at the bottom thereof. A ceiling comprising sheeting is secured in place at the bottom of the beams by fastener means comprising fastener elements each extending up through holes in the sheeting and through the said slot of a respective beam and into said beam, with means at the lower ends of said elements engaging the bottom of the sheeting, and means at the upper ends of said elements engaging the lips at opposite sides of the slot of said beam.

Other objects and features will be in part apparent and in part pointed out hereinafter.

BRIEF DESCRIPTION OF THE DRAWINGS

FIG. 1 is a top plan of a roof structure of this invention for a trailer, with the roof covering partly broken away to show interior detail including the beams or roof bows and the ceiling of the structure, certain of the roof bows also being partly broken away;

FIG. 2 is a vertical transverse section on line 2—2 of FIG. 1, on a larger scale than FIG. 1;

FIG. 3 is a top plan on a larger scale than FIG. 2 of an end portion of a beam or roof bow per se, partly broken away and shown in section;

FIG. 4 is a side elevation of FIG. 3, also partly broken away and shown in section;

FIG. 5, 6 and 7 are vertical transverse sections on lines 5—5, 6—6 and 7—7 of FIG. 3;

FIG. 8 is a section on line 8—8 of FIG. 5;

FIG. 9 is an enlarged section on line 9—9 of FIGS. 1 and 2, showing fastener means for fastening the ceiling to a roof bow, the fastener means being partly broken away and shown in section;

FIG. 10 is a view of a fastener means per se as viewed on line 10—10 of FIG. 9;

FIG. 11 is a section on line 11—11 of FIG. 10:

FIG. 12 is a horizontal section on line 12—12 of FIG. 9;

Corresponding reference characters indicate corresponding parts throughout several views of the drawings.

DETAILED DESCRIPTION

Figure 15:
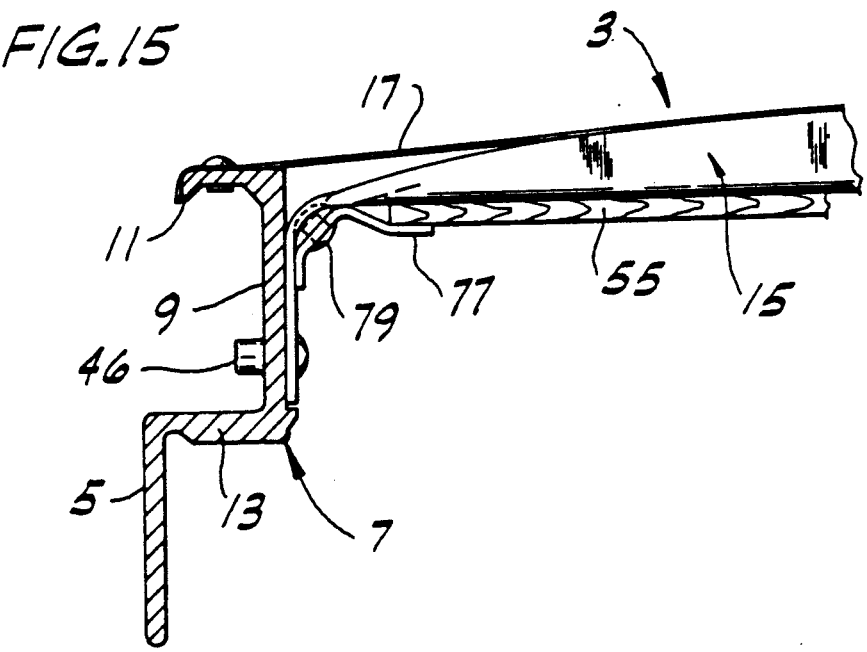
FIG. 15 is an enlarged fragment of FIG. 14, in section on line 15—15 of FIG. 13.

Referring to the drawings; there is generally indicated at 1 (see FIGS. 1 and 2) a land vehicle, such as a tractor-trailer, having a roof structure 3 spanning the sides 5 of the vehicle. The sides 5 are illustrated as having side rails 7 at the top extending lengthwise of the vehicle, each side rail being generally of channel section having a vertical web 9 and outwardly extending upper and lower flanges 11 and 13 (see particularly FIG. 15). The roof structure 3 comprises a series of beams, which may also be referred to as roof bows, each designated 15 extending transversely across the top of the vehicle (between the top side channels 7) spaced at intervals along the length of the vehicle, a covering 17 of any suitable material (e.g. sheet aluminum) secured in any suitable manner on top of the roof bows, e.g. secured to the side rails as illustrated in FIG. 15, and a ceiling 19 comprising sheeting, more particularly plywood sheeting, secured to the bottom of the roof bows by fastener means 21 in accordance with this invention.

Each beam or roof bow 15 is formed specially in accordance with this invention of sheet metal, e.g. of sheet metal strip stock, bent on lines 23 and 25 extending lengthwise thereof to have in transverse section a central web 27, side flanges 29 integral with the web extending downwardly from the web (as distinguished from the flanges of the roof bow shown in the aforesaid U.S. Pat. No. 4,660,882 which extend upwardly from the web), and lips 31 integral with the flanges at the lower edges of the flanges (at lines 25) opposite the web extending inwardly toward one another from the flanges and terminating short of the central vertical longitudinal plane 33 of the beam or roof bow so that it has a longitudinal slot 35 at the bottom thereof. The lips are generally coplanar in a horizontal plane, having horizontal portions 37 extending inwardly from the lower edges of the flanges with inner margins 39 bent up somewhat toward the web 27 to extend upwardly and inwardly at an acute angle to the horizontal plane of portions 37. Each beam or roof bow has a relatively long intermediate reach 41 of the box-like or lipped channel section which appears in FIGS. 7 and 9 and integral end reaches 43 in which the flanges 29 are deformed with respect to portions thereof in the intermediate reach from their downwardly extending position with respect to the web to a laterally outwardly extending position generally coplanar with the web (see FIG. 8) and extending in said generally coplanar position from a point spaced inwardly from the respective outer end of the beam or roof bow. The lips 31 in each end reach 43 of the beam or roof bow retain their inwardly extending relationship out to a respective outer end thereof, lying generally flat against respective surfaces of the flanges Also, the beam or roof bow is bent downwardly adjacent said point to have a downwardly extending flat end portion 45 for attachment to the side rails of the vehicle at the top as indicated at 46.

As initially formed, each beam or roof bow member 15 is of the box-like cross-section or lipped channel section which appears in FIGS. 7 and 9 throughout the length of the member. In accordance with this invention, the member is then subjected to further working to form the stated integral end reaches 43 with the bent-down end portions 45. As to each of the stated end reaches 43, the end portions 29A of the flanges 29 therein are deformed with respect to the main portions thereof in the intermediate reach 41 to have a gradual transition from their downwardly extending disposition with respect to the web 27, which is their disposition as the roof bow is used on a vehicle (and their disposition as shown in FIGS. 7 and 9 of the drawing) to a laterally outwardly extending position generally coplanar with the web 27 as shown in FIGS. 3, 4 and 8. The flanges, so deformed into said position generally coplanar with the web, extend in that position generally from a line 47 transverse to the roof bow (where it is bent to have the downwardly extending end portion 45) spaced inwardly from the respective outer end 49 of the member 15 a short distance relative to the length of said transition.

The portions 31A of the lips 31 in each said end reach 43 of the roof bow retain their generally coplanar relationship, without being twisted, out to the respective outer end 49 of the member 15 with the portions of the lips from the line 47 to the end 49 lying generally flat against the portions 29A of the flanges from said line 47 to the end 49. The member 15 is bent downwardly as appears in FIGS. 1-4 at said line 47 to have said downwardly extending end portion 45 for attachment to a side rail 9 of the vehicle. Said downwardly extending flat end portion 45 includes a flat portion 27A of the web 27, portions 29A of the flanges 29 generally coplanar with portion 27A, and portions 31A of the lips 31 generally flat against the inside of the flange portions 29A. End portion 45 is provided with holes 51 through the lip portions 31A and flange portions 29A for receiving fasteners for purposes of said attachment to a side rail. The web may be struck in between the lips at the bend on line 47 to provide a gusset 53 of triangular form for strengthening the roof bow at the bend. The roof bow may be slightly arched upwardly from one bend line 47 to the other.

As illustrated in FIGS. 1 and 2, the ceiling 19 comprises a single series of rectangular sheets of plywood each designated 55, e.g. 4' by 8' by ¼" sheets, arranged end-to-end longitudinally of the top of the trailer and disposed centrally with respect to the width of the trailer. Each of these sheets has rows of holes 57 for the fastener means 21 pre-drilled therein with these rows extending transversely of the sheet and spaced at intervals corresponding to the spacing of the beams. Typically the beams are spaced at 24 inch intervals and the rows are spaced at 24 inch intervals. Thus, for the 4' by 8' sheet as herein illustrated there are three rows of holes 57 spaced at 24 inch intervals. The holes in each row may be spaced at 9 inch intervals. Each sheet also has a series of semi-circular notches 59 at each end thereof to provide circular holes in the ceiling at the abutting ends of the sheets in the series. The sheets are applied to the bottoms of the beams or roof bows 15 with the rows of holes 57 and the abutting ends of the sheets lined up with the slot 35 in the bottom of a respective beam or roof bow, and held in place by the fastener means 21, the latter comprising fastener elements each extending up through the holes 57 in the sheets and the holes 59, 59 formed by the mating notches 59 at the abutting ends of the sheets.

Each of the fastener elements 21 comprises a stud 61 having a lower portion 63 of circular cross section of relatively short length, with a taper at the upper end of portion 63 to an upper portion or stem 65 of reduced cross-section, a circular lower end head 67 at the lower end of portion 63 and a crosshead 69 at the upper end of portion 65. Portion 63 is of somewhat smaller diameter than hole 57 for relatively loose reception in the hole and the lower end head 67 is of larger diameter than the hole. The crosshead 69 has a length (from one end thereof to the other) less than the diameter of hole 57 and greater than the width of the slot 35 in the bottom of each beam or roof bow 15 (see FIGS. 9, 11 and 12) and a width (see FIG. 10) less than the width of the slot. Portion 65 of the stud has a width less than the width of the slot (and less than the overall width of the crosshead). Each side portion of the crosshead at opposite sides of the stud is formed at the bottom thereof with surface portions 71 convergent toward a bottom edge 73, these surface portions constituting cam surfaces engageable with the bent-up margins 39 of the lips 31 (as will appear) for camming them downwardly. The stated bottom edges 73 of the crosshead are inclined upwardly from the outer ends of the crosshead to the upper portion 65 of the stud (see FIG. 9) for interlocking with the lips. Further, element 21 has a socket 75 in its lower end for reception of a wrench to turn it.

The pre-drilled and end-notched plywood sheets 55 are applied generally one at a time to the bottoms of the beams or roof bows 15 as above described and as shown in FIGS. 1 and 2, i.e. with the rows of holes 57 registering with the slots 35 in the bottom of the beams or roof bows, and fastener elements 21 are applied to fasten each sheet in place by disposing the crosshead 69 of each fastener element to extend lengthwise in the vertical plane of the slot 35 of a respective beam or roof bow, entering the fastener element in a respective hole 57 in the sheet and moving it up to locate the crosshead above the bent-up inner margins 39 of the lips 31 of the beam or roof bow at opposite sides of the slot and to engage the lower end head 67 of the fastener element with the bottom surface of the sheet 55 around the hole 57, and then turning the fastener element generally on its vertical axis by means of a wrench inserted in the socket 75 to position the crosshead to extend transversely of the beam or roof bow within the latter in engagement with margins 39 of the lips 31 at opposite sides of the slot 35. As the fastener element is turned, the cam surfaces 71 engage and spring down the lip margins 39, thereby to exert spring force on the element for holding it firmly in place. The element is interlocked with the lips 31 by reason of the lip margins 39 angling up as shown in FIG. 9 under the inclined bottom edges 73 of the crosshead. Heads 67 constitute means at the lower ends of elements 21 engaging the bottom of the plywood sheeting and crossheads 69 constitute means at the upper ends of the elements engaging the lips at opposite sides of the slots the beams functioning to secure the sheeting to the beams.

Figure 13:
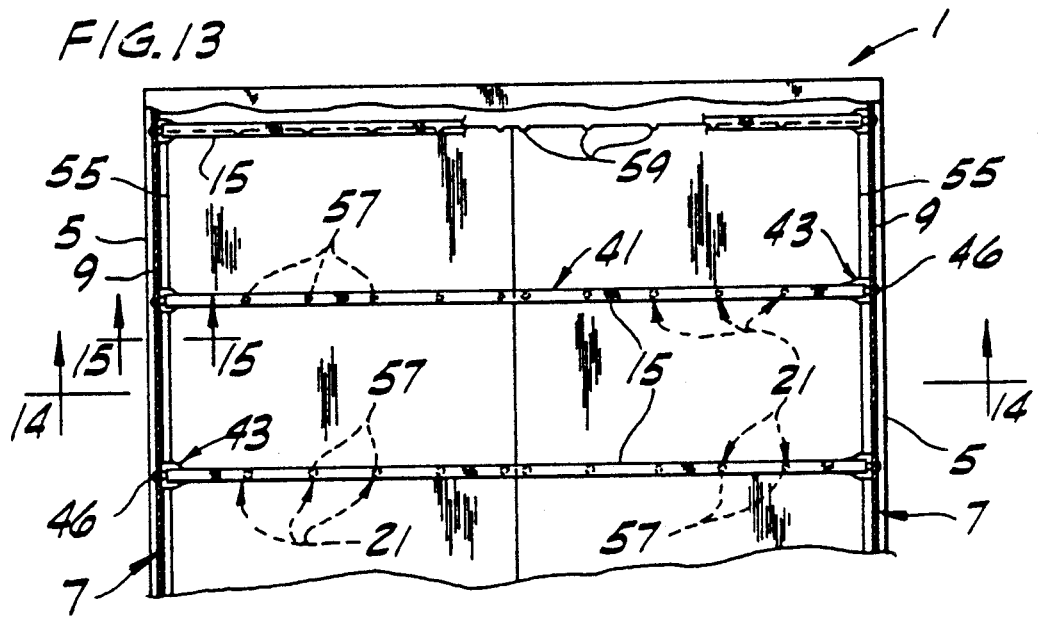
FIG. 13 is a view similar to FIG. 1 of a modification of the FIG. 1 structure.
Figure 14:
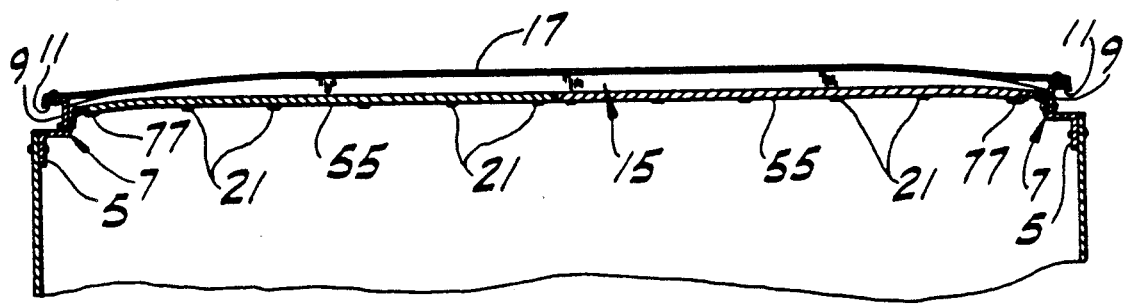
FIG. 14 is a vertical transverse section on line 14—14 of FIG. 13.

A single series of sheets 55 extending along the middle of the roof structure as shown in FIGS. 1 and 2 is often sufficient for protection of the roof bows with regard to the handling of cargo as generally encountered, even though it leaves exposed end portions of the roof bows at both sides of the roof structure. In certain instances, however, it may be desirable to provide a ceiling that extends generally the full width of the roof structure, and that may be accomplished as shown in FIGS. 13–15 by providing two side-by-side series of sheets 55 with holes and notches in the sheets and fasteners 21 arranged as shown in FIGS. 13 and 14. Since the roof bow 15 is of decreasing depth and the slot in its bottom widens out in end reaches 43 toward the downturned ends 45, fasteners 21 cannot be used toward the ends of the roof bow, and the sheets 55 are held up at each side margin thereof adjacent the respective side of the trailer by a clip such as indicated at 77 in FIG. 15 secured as by riveting as indicated at 79 to the gussets 53 of the roof bow at said side of the trailer.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Roof structure for a land vehicle, such as a tractor-trailer, comprising a series of beams extending transversely across the top of the vehicle spaced at intervals along the length of the vehicle, each beam being formed of sheet metal to have in transverse cross-section, a central web, side flanges integral with the web extending downwardly from the web, and lips integral with the flanges at the lower edges of the flanges opposite the web extending inwardly toward one another from the flanges and terminating short of the central vertical longitudinal Plane of the beam so that the beam has a longitudinal slot at the bottom thereof, and a ceiling comprising sheeting at the bottom of said beams, and fastener means for securing the sheeting in place at the bottom of said beams, said fastener means comprising fastener elements each extending up through holes in the sheeting and through the said slot of a respective beam and into said beam, means at the lower ends of said elements engaging the bottom of the sheeting, and means at the upper ends of said elements engaging the lips at opposite sides of the slot of said beam.

2. Roof structure as set forth in claim 1 wherein the lips are formed to exert spring force on the fastener means tending to hold it in place.

3. Roof structure as set forth in claim 2 wherein the lips are formed to exert said spring force on the fastener means by being bent to extend at least in part upwardly and inwardly toward the slot for being sprung downwardly at the slot by the fastener means at the upper end of said fastener elements thereby to exert said force.

4. Roof structure as set forth in claim 3 wherein the lips have generally horizontal main portions extending inwardly from the lower edges of the flanges and inner margins bent to extend upwardly and inwardly from said main portions, said inner margins being sprung downwardly by the fastener means at the upper end of said fastener elements thereby to exert said force.

5. Roof structure as set forth in claim 1 wherein each fastener element comprises a stud having a head at its lower end constituting said lower end means and a crosshead at its upper end constituting said upper end means, said crosshead having a length less than the diameter of the holes in the sheeting and greater than the width of the slot and a width less than the width of said slot so that, with the crosshead at the upper end of the stud disposed to extend lengthwise in the vertical plane of the slot, the fastener may be entered in a hole in the sheeting, moved up to locate the crosshead above the lips at opposite sides of the slot in the bottom of a beam and to engage the lower end head of the fastener with the bottom surface of the sheeting around the hole, and then turned generally on its vertical axis to position the crosshead to extend transversely of the beam in engagement with the lips at opposite sides of the slot.

6. Roof structure as set forth in claim 5 wherein the lips are formed to exert spring force on each stud for holding the stud in place by being bent to extend at least in part upwardly and inwardly toward the slot for being sprung downwardly at the slot by the crosshead of the stud thereby to exert said force.

7. Roof structure as set forth in claim 6 wherein each side portion of the crosshead at opposite sides of the stud is formed at the bottom thereof with surface portions convergent toward a bottom edge, said convergent surface portions constituting cam surfaces engageable with the lips for camming them downwardly as the stud is turned.

8. Roof structure as set forth in claim 7 wherein the said bottom edges of the crosshead are inclined upwardly from the outer ends of the crosshead to the stud for interlocking with the lips.

9. Roof structure as set forth in claim 1 wherein each beam has an intermediate reach and integral end reaches, portions of the flanges in each said end reach being deformed with respect to portions thereof in the intermediate reach to have a gradual transition from their downwardly extending disposition with respect to the web to a laterally outwardly extending position generally coplanar with the web and extending in said generally coplanar position from a point spaced inwardly from the respective outer end of said beam, said lips, in each said end reach of the beam, retaining their inwardly extending relationship out to a respective outer end of said beam with portions of said lips from said point to said outer end of said beam lying generally flat against respective surfaces of the flanges, said beam being bent downwardly adjacent said point to have a downwardly extending generally flat end portion for attachment to a side of a vehicle.

10. Roof structure as set forth in claim 9 wherein the lips are formed to exert spring force on the fastener means tending to hold it in place.

11. Roof structure as set forth in claim 10 wherein the lips are formed to exert said spring force on the fastener means by being bent to extend at least in part upwardly and inwardly toward the slot for being sprung downwardly at the slot by the fastener means at the upper end of said fastener elements thereby to exert said force.

12. Roof structure as set forth in claim 11 wherein the lips have generally horizontal main portions extending inwardly from the lower edges of the flanges and inner margins bent to extend upwardly and inwardly from said main portions, said inner margins being sprung downwardly by the fastener means at the upper ends of said fastener elements thereby to exert said force.

13. Roof structure as set forth in claim 9 wherein each fastener element comprises a stud having a head at its lower end constituting said lower end means and a crosshead at its upper end constituting said upper end means, said crosshead having a length less than the diameter of the holes in the sheeting and greater than the width of the slot and a width less than the width of said slot so that, with the crosshead at the upper end of the stud disposed to extend lengthwise in the vertical plane of the slot, the fastener may be entered in a hole in the sheeting, moved up to locate the crosshead above the lips at opposite sides of the slot in the bottom of a beam and to engage the lower end head of the fastener with the bottom surface of the sheeting around the hole, and then turned generally on its vertical axis to position the crosshead to extend transversely of the beam in engagement with the lips at opposite sides of the slot.

14. Roof structure as set forth in claim 13 wherein the lips are formed to exert spring force on each stud for holding the stud in place by being bent to extend at least in part upwardly and inwardly toward the slot for being sprung downwardly at the slot by the crosshead of the stud thereby to exert said force.

15. Roof structure as set forth in claim 14 wherein each side portion of the crosshead at opposite sides of the stud is formed at the bottom thereof with surface portions convergent toward a bottom edge, said convergent surface portions constituting cam surfaces engageable with the lips for camming them downwardly as the stud is turned.

16. Roof structure as set forth in claim 15 wherein the said bottom edges of the crosshead are inclined upwardly from the outer ends of the crosshead to the stud for interlocking with the lips.

17. Roof structure as set forth in claim 1 wherein the ceiling comprises rectangular sheets of plywood having rows of said holes pre-drilled therein with said rows spaced at intervals corresponding to the spacing of the beams.

18. A roof structure as set forth in claim 17 wherein the ceiling comprises a single series of rectangular sheets of plywood arranged end-to-end longitudinally of the top of the vehicle, abutting end edges of said sheets being located under a beam and having mating notches forming holes, and fastener elements in the latter holes.

19. A roof structure as set forth in claim 17 wherein the ceiling comprises two series of rectangular sheets of plywood, the sheets in each series being arranged end-to-end longitudinally of the trailer, the two series being arranged in side-by-side relation and forming a generally full-width ceiling for the vehicle, and clips secured to the beams adjacent the ends thereof holding up the sheets at the side edges thereof.

20. A roof bow comprising an elongate member formed of sheet metal having an elongate intermediate reach and integral end reaches, said member being formed to have in transverse cross-section a central web, side flanges integral with the web and lips integral with the side flanges at edges of the side flanges opposite to the central web, the flanges, in the intermediate reach of said member, extending downwardlY from the web, and the lips, in the intermediate reach, extending inwardly toward one another from the lower edges of the flanges in generally coplanar relation and terminating short of the central vertical longitudinal plane of the roof bow so that it has a longitudinal slot at the bottom thereof, portions of the flanges in each said end reach of the roof bow being deformed with respect to portions thereof in the intermediate reach to have a gradual transition from their downwardly extending disposition with respect to the web to a laterally outwardly extending position generally coplanar with the web and extending in said generally coplanar position from a point spaced inwardly from the respective outer end of said member, said lips, in each said end reach of the roof bow, retaining their generally coplanar relationship out to a respective outer end of said member with portions of said lips from said point to said outer end of said member lying generally flat against respective surfaces of the flanges, said member being bent downwardly adjacent said point to have a downwardly extending generally flat end portion for attachment to a side member of a vehicle.

21. A fastener element for insertion through a hole in ceiling sheeting and a slot in the bottom of a roof bow to fasten the sheeting to the roof bow, the roof bow being one formed of sheet metal to have in transverse cross-section, a central web, side flanges integral with the web extending downwardly from the web, and lips integral with the flanges at the lower edges of the flanges opposite the web extending inwardly toward one another from the flanges and terminating short of the central vertical longitudinal plane of the beam so that the roof bow has a longitudinal slot at the bottom thereof, said fastener element comprising a stud having a head at its lower end and a crosshead at its upper end, said crosshead having a length less than the diameter of the holes in the sheeting and greater than the width of the slot and a width less than the width of said slot so that, with the crosshead at the upper end of the stud disposed to extend lengthwise in the vertical plane of the slot, the fastener may be entered in a hole in the sheeting, moved up to locate the crosshead above the lips at opposite sides of the slot in the bottom of a beam and to engage the lower end head of the fastener with the bottom surface of the sheeting around the hole, and then turned generally on its vertical axis to position the crosshead to extend transversely of the roof bow in engagement with the lips at opposite sides of the slot.

22. A fastener element as set forth in claim 21 wherein each side portion of the crosshead at opposite sides of the stud is formed at the bottom thereof with surface portions convergent toward a bottom edge, said convergent surface portions constituting cam surfaces engageable with the lips for camming them downwardly as the stud is turned.

23. A fastener element as set forth in claim 22 wherein the said bottom edges of the crosshead are inclined upwardly from the outer ends of the crosshead to the stud for interlocking with the lips.

* * * * *